(12) United States Patent
Manoharan et al.

(10) Patent No.: US 11,969,649 B2
(45) Date of Patent: *Apr. 30, 2024

(54) PROMINENT DISPLAY OF TARGETED GAME IN SEARCH RESULTS

(71) Applicant: Roblox Corporation, San Mateo, CA (US)

(72) Inventors: Aswath Manoharan, Sunnyvale, CA (US); Eric Holmdahl, San Francisco, CA (US); Jianan Duan, Foster City, CA (US); Nikolaus Sonntag, Foster City, CA (US); I-Wu Lu, San Bruno, CA (US)

(73) Assignee: Roblox Corporation, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/573,312

(22) Filed: Jan. 11, 2022

(65) Prior Publication Data

US 2022/0126200 A1 Apr. 28, 2022

Related U.S. Application Data

(63) Continuation of application No. 16/692,881, filed on Nov. 22, 2019, now Pat. No. 11,224,803.

(51) Int. Cl.
*A63F 9/24* (2006.01)
*A63F 13/352* (2014.01)
(Continued)

(52) U.S. Cl.
CPC ............ *A63F 13/352* (2014.09); *A63F 13/79* (2014.09); *G06F 16/9035* (2019.01); *G06F 16/9038* (2019.01)

(58) Field of Classification Search
CPC ........ A63F 13/35; A63F 13/00; A63F 13/352; A63F 13/335; A63F 13/79;
(Continued)

(56) References Cited

U.S. PATENT DOCUMENTS 8,660,673 B2 2/2014 Short
9,384,226 B1 * 7/2016 Goel ..................... G06F 16/951
(Continued)

FOREIGN PATENT DOCUMENTS

| JP | 2006-092178 | 4/2006 |
|---|---|---|
| JP | 2013-250899 | 12/2013 |
| JP | 2014-132436 | 7/2014 |

OTHER PUBLICATIONS

USPTO, Non-final Office Action for U.S. Appl. No. 16/692,881, dated Apr. 8, 2021, 15 pages.
(Continued)

*Primary Examiner* — Justin L Myhr
(74) *Attorney, Agent, or Firm* — IP Spring

(57) ABSTRACT

Prominent display of a targeted game in search results from a search within an online gaming platform. In some implementations, a server receives a search query from a device. The search query is executed against a data store of available games to obtain search results indicating a set of games. Based on one or more characteristics of the set of games, it is determined whether the search query is directed to a narrow search for a particular game in the set of games. In response to determining such a narrow search, the particular game is designated with a highlight indication, and the search results and highlight indication are transmitted to the device, causing display of a user interface that includes at least a portion of the search results. The highlight indication causes the device to display an identifier of the particular game as highlighted relative to other search results.

20 Claims, 6 Drawing Sheets

(51) Int. Cl.
*A63F 13/79* (2014.01)
*G06F 16/9035* (2019.01)
*G06F 16/9038* (2019.01)

(58) Field of Classification Search
CPC .... A63F 2300/535; A63F 13/48; A63F 13/61; A63F 13/85; G06F 16/9538; G06F 16/951; G06F 16/9535; G06F 16/24578; G06F 16/90324; G06F 16/90335
See application file for complete search history.

(56) References Cited

U.S. PATENT DOCUMENTS

| | | | |
|---|---|---|---|
| 2002/0142815 | A1 | 10/2002 | Candelore |
| 2005/0209002 | A1 | 9/2005 | Blythe et al. |
| 2006/0121991 | A1 | 6/2006 | Borinik et al. |
| 2006/0287986 | A1 | 12/2006 | Westphal |
| 2007/0072678 | A1 | 3/2007 | Dagres |
| 2007/0155490 | A1 | 7/2007 | Phillips et al. |
| 2008/0220854 | A1 | 9/2008 | Midgley et al. |
| 2009/0111581 | A1 | 4/2009 | Ostergren et al. |
| 2010/0005060 | A1* | 1/2010 | Shebanow .......... G06F 16/2228 707/E17.108 |
| 2012/0166411 | A1 | 6/2012 | MacLaurin et al. |
| 2013/0031214 | A1* | 1/2013 | Nielsen .................. G06F 8/65 709/219 |
| 2013/0127921 | A1* | 5/2013 | Funabashi ............. G09G 5/006 345/672 |
| 2013/0290344 | A1 | 10/2013 | Glover et al. |
| 2014/0181218 | A1* | 6/2014 | Roberts ................. H04L 51/52 709/206 |
| 2014/0289648 | A1 | 9/2014 | Rowe et al. |
| 2015/0045110 | A1* | 2/2015 | Lempel ................. A63F 13/46 463/25 |
| 2015/0120689 | A1 | 4/2015 | Miao et al. |
| 2015/0243123 | A1 | 8/2015 | Borissov et al. |

OTHER PUBLICATIONS

WIPO, International Search Report for International Patent Application No. PCT/US2019/062986, dated Feb. 6, 2020, 2 pages.

WIPO, Written Opinion for International Patent Application No. PCT/US2019/062986, dated Feb. 6, 2020, 8 pages.

USPTO, Notice of Allowance for U.S. Appl. No. 16/692,881, dated Sep. 15, 2021, 8 pages.

JPO, Notice of Reasons for Rejection (with English translation) for Japanese Patent Application No. 2022-529662, dated Jun. 19, 2023, 16 pages.

EPO, Extended European Search Report for European Patent Application No. 19953656.6, dated Aug. 4, 2023, 9 pages.

\* cited by examiner

PROMINENT DISPLAY OF TARGETED GAME IN SEARCH RESULTS

CROSS-REFERENCE TO RELATED APPLICATION

The present application is a continuation of U.S. patent application Ser. No. 16/692,881, titled PROMINENT DISPLAY OF TARGETED GAME IN SEARCH RESULTS and filed Nov. 22, 2019, the contents of which are hereby incorporated herein by reference in their entirety.

TECHNICAL FIELD

This disclosure relates to the field of computerized data searching and, in particular, to methods, systems, and computer readable media for prominent display of targeted games in search results resulting from searches of online gaming platform data.

BACKGROUND

Some online gaming platforms allow users to create content such as games and game assets, connect with each other, interact with each other (e.g., within a game), and share information with each other via the Internet. Users of online gaming platforms may participate in multiplayer gaming environments in which games or parts of games have been created by other users.

When users search through user generated content (e.g., games, items for games, etc.) or other content, a search engine may return search results from game data based on factors such as popularity in terms of numbers of downloads by users, rating by users, etc. However, such search engines may provide too many search results that confuse and frustrate users who are looking for results relating to a targeted item such as a particular game. Accordingly, there may exist a need for improved display of particular searched games in search results provided within a content search engine of an online gaming platform (or other system).

SUMMARY

Implementations of this application relate to prominent display of a targeted game in search results. In some implementations, a method includes receiving, at a server, a search query from a device, and executing the search query against a data store of available games to obtain search results from the data store, where the search results indicate a set of games of the available games. Based on one or more characteristics of the set of games of the search results, the method determines whether the search query is directed to a narrow search for a particular game in the set of games. In response to determining that the search query is directed to a narrow search for the particular game, designating the particular game with a highlight indication. The method transmits the search results and the highlight indication to the device, causing display, by the device, of a user interface that includes at least a portion of the search results by the device, where the highlight indication causes the device to display an identifier of the particular game as highlighted relative to other search results of the at least a portion of the search results.

Various implementations and examples of the method are described. For example, in some implementations, determining whether the search query is directed to a narrow search for the particular game is based on a characteristic including a number of sessions of the particular game played by users of a game platform that serves the particular game.

In some implementations, determining whether the search query is directed to a narrow search for the particular game includes: determining a number of qualifying sessions of respective games of the set of games as played by users of the set of games; and determining whether any game of the respective games qualifies as the particular game by having been played at least a threshold proportion of the number of qualifying sessions of the respective games of the set of games. In some examples, determining the number of qualifying sessions includes: obtaining a dataset comprising sessions of each game of the set of games; and for each session of each game of the set of games: determining whether an amount of time that the session is active meets a threshold amount of time; in response to determining that the amount of time meets the threshold amount of time, identifying the session as a qualifying session; and in response to determining that the amount of time does not meet the threshold amount of time, identifying the session as a non-qualifying session.

In some implementations, determining the number of qualifying sessions includes: obtaining a dataset comprising sessions of each game of the set of games; and for each session of each game of the set of games: determining whether the session was initiated based on selection of a previous search result from a previous search query input to the server, where the previous search result identified the game; in response to determining that the session was initiated based on the selection of the previous search result from the previous search query, identifying the session as a qualifying session; and in response to determining that the session was not initiated by the selection of the previous search result from the previous search query input to the server, identifying the session as a non-qualifying session.

In some implementations, determining the number of qualifying sessions includes: obtaining a dataset comprising sessions of each game of the set of games; and for each session of each game of the set of games: determining whether a user of the session performed a threshold number of activities during the session, where the activities include at least one of: communicating with another user during the session, or purchasing one or more game items during the session; in response to determining that the user performed the threshold number of activities during the session, identifying the session as a qualifying session; and in response to determining that the user did not perform the threshold number of activities during the session, identifying the session as a non-qualifying session.

In some implementations, determining whether the search query is directed to a narrow search for the particular game includes determining whether at least a portion of the search query matches a canonical title of the particular game, where absence of the match of the search query to the canonical title indicates that the search query is not directed to the narrow search. In some implementations, the method includes determining the canonical title of the particular game, where determining the canonical title includes: determining a plurality of different titles used to designate the particular game in a history of availability of the particular game to users; and comparing the plurality of different titles to determine a common string among the plurality of different titles, where the common string is the canonical title for the particular game.

In some implementations, displaying the identifier of the particular game highlighted relative to other search results includes at least one of: displaying the identifier of the particular game in a highlight slot in the user interface while displaying other search results on a display device, or displaying the identifier of the particular game with a larger size than the other search results. In some implementations, the method includes, in response to determining that the search query is not directed to a narrow search for any game of the set of games, transmitting the search results to the device without the highlight indication.

In some implementations, the threshold proportion is a first threshold proportion, and, in response to designating the particular game with a highlight indication, further comprising, after a period of time after the designating: receiving second search results from the data store in response to executing a second search query that is the same as the search query, where the second search results indicate a second set of games of the available games; determining whether the particular game has been played in at least a second threshold proportion of the number of qualifying sessions of the respective games of the second set of games, where the second threshold proportion is different than the first threshold proportion; and in response to determining that the particular game has not been played in at least the second threshold proportion of the number of qualifying sessions of the respective games of the second set of games, removing the highlight indication from the particular game. In some examples, the second threshold proportion is greater than the first threshold proportion.

Some implementations can include a system comprising at least one processor coupled to a nontransitory computer readable medium having stored thereon software instructions that, when executed by the one or more processors, cause the one or more processors to perform operations. The operations can include receiving a search query from a device and executing the search query against a data store of available games to obtain search results from the data store, where the search results indicate a set of games of the available games. The operations also include, based on one or more characteristics of the set of games of the search results, determining whether the search query is directed to a narrow search for a particular game in the set of games. The operations include, in response to determining that the search query is directed to a narrow search for the particular game, designating the particular game with a highlight indication. The operations include transmitting the search results and highlight indication to the device causing display, by the device, of a user interface that includes at least a portion of the search results, where the highlight indication causes the device to display an indication of the particular game as highlighted relative to other search results of the at least a portion of the search results.

Various implementations and examples of the system are described. For example, in some implementations, the operation of determining whether the search query is directed to a narrow search for the particular game includes: determining a number of qualifying sessions of respective games of the set of games as played by users of the set of games; and determining whether the particular game has been played at least a threshold proportion of the number of qualifying sessions of the respective games of the set of games.

In some implementations of the system, the operation of determining the number of qualifying sessions includes obtaining a dataset comprising sessions of each game of the set of games, and for each session of each game of the set of games: determining whether an amount of time that the session is active meets a threshold amount of time; determining whether the session is initiated based on a selection of a previous search result from a previous search query input to a server, where the previous search result identified the game; in response to determining that the amount of time meets the threshold amount of time and determining that the session is initiated based on the selection of the previous search result, identifying the session as a qualifying session; and in response to determining that the amount of time does not meet the threshold amount of time or determining that the session is not initiated by the selection of the previous search result, identifying the session as a non-qualifying session.

In some implementations, determining whether the search query is directed to a narrow search for the particular game includes determining whether at least a portion of the search query matches a canonical title of the particular game. For example, determining the canonical title of the particular game can include determining a plurality of different titles used to designate the particular game in a history of availability of the particular game to users; and comparing the plurality of different titles to determine a common string among the plurality of different titles, where the common string is the canonical title for the particular game. In some implementations, the operations further include, in response to determining that the search query does is not directed to a narrow search for any game of the set of games, transmitting the search results to the device without the highlight indication.

In some implementations, a non-transitory computer readable medium has stored thereon software instructions that, when executed by a processor of a device, cause the processor to perform operations. The operations include receiving a search query, and causing execution of the search query against a data store of available games to obtain search results from the data store, where the search results indicate a set of games of the available games. The operations include, based on one or more characteristics of the set of games in the search results, determining that the search query is directed to a narrow search for a particular game in the set of games. The operations include, in response to determining that the search query is directed to a narrow search for the particular game, designating the particular game with a highlight indication. The operations include causing at least a portion of the search results to be displayed in a user interface by a display device, where the highlight indication causes an identifier of the particular game to be displayed highlighted relative to other search results of the at least a portion of the search results. In some implementations, the operation of determining that the search query is directed to a narrow search for the particular game includes at least one of: determining that the particular game has been played at least a threshold proportion of a number of qualifying sessions of respective games of the set of games; or determining that at least a portion of the search query matches a canonical title of the particular game.

DETAILED DESCRIPTION

Figure 1:
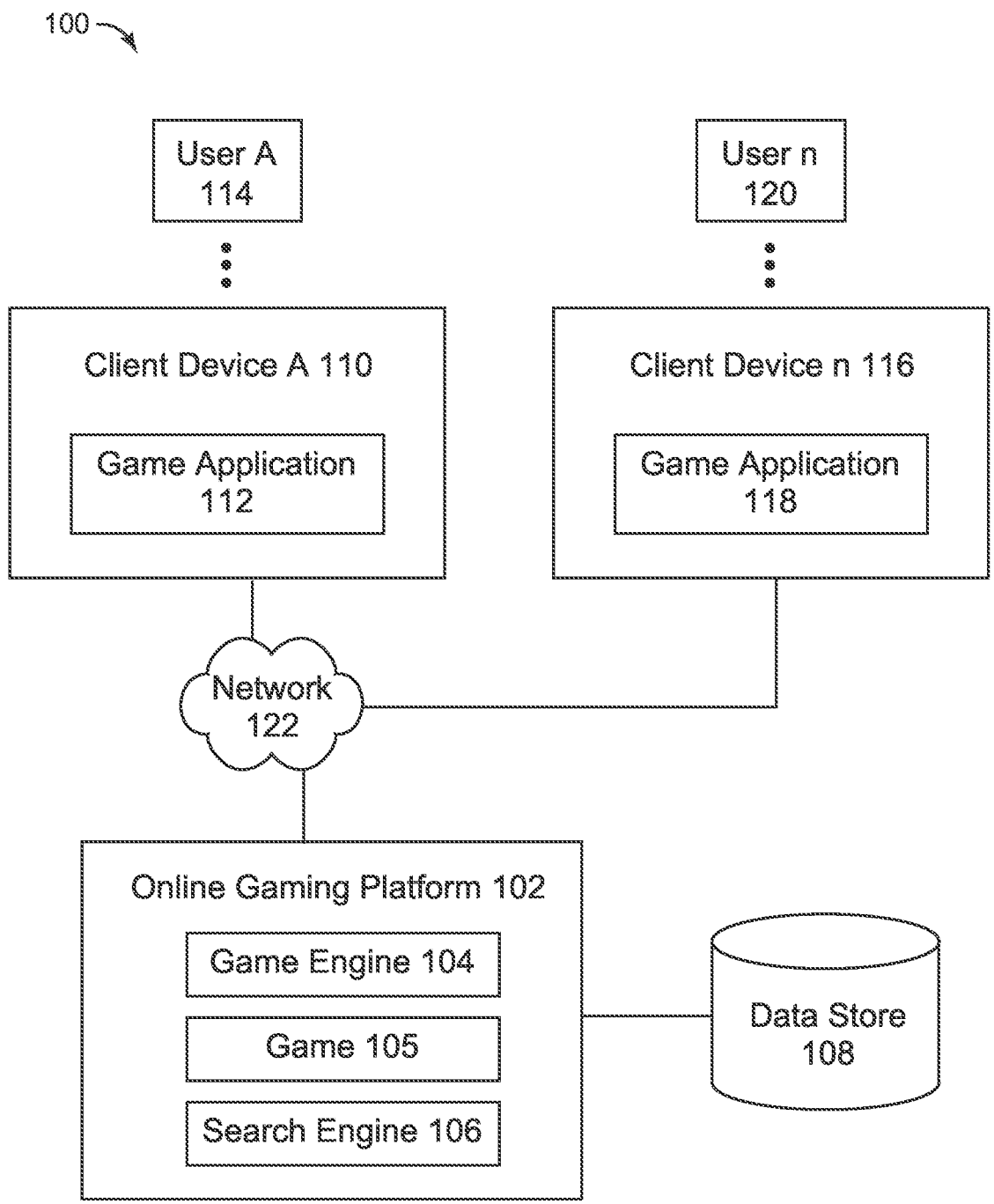
FIG. 1 is a diagram of an example system architecture, in accordance with some implementations.

One or more implementations described herein relate to prominent display of a targeted game in search results from a search within an online gaming platform. Features can include detecting a search of a targeted game and providing prominent display of that game.

Online gaming platforms (also referred to as "user-generated content platforms" or "user-generated content systems") offer a variety of ways for users to interact with one another. For example, users of an online gaming platform may create games or other content or resources (e.g., characters, graphics, items for game play within a virtual world, etc.) within the gaming platform.

Users of an online gaming platform may work together towards a common goal in a game or in game creation, share various virtual gaming items, send electronic messages to one another, and so forth. Users of an online gaming platform may play games, e.g., including characters (avatars) or other game objects and mechanisms. An online gaming platform may also allow users of the platform to communicate with each other. For example, users of the online gaming platform may communicate with each other using voice messages (e.g., via voice chat), text messaging, video messaging, or a combination of the above. Some online gaming platforms can provide a virtual three-dimensional environment in which users can play an online game.

In order to help enhance the entertainment value of an online gaming platform, the platform can provide a search engine for games, game content, or other game related resources, where users of the online gaming platform may search for games or such other content using the search engine. Since games and game resources may be being created, changed, and added to available game data at high rates by various users, the search engine provides improved discoverability of available games and resources. For example, a user can input a search query to the search engine that indicates a game title, subject, or other characteristic of games sought by the user. The search engine searches a set of games and game data and provides as outputs search results which may include a list of games (and/or game-related resources) that were determined by the search engine to match the search query. In some implementations, a search result can be selected by a user to initiate and enter the associated game, to communicate with an associated user, or perform some other action related to the selected game.

However, some search results provided by such search engines may not be satisfactory for a user. For example, the search engine may provide a large number of search results, potentially causing confusion and frustration to users who are looking for a smaller set of search results relating to a targeted item such as a particular game. In some online gaming platforms, users have the ability to create a large variety of games, game types, resources etc., thus causing a large number of potential matches to search queries and large numbers of search results that match a particular search query. Such confusion may result in selection and processing of game sessions that are undesired by a user (e.g., if the user selects to join a game that is not the desired game) and/or result in follow-up search queries that are input and processed after the initial unsatisfactory search results are provided.

In addition, several games of the online gaming platform may be assigned the same or similar titles. For example, in some cases, if a certain game from one user becomes popular on the online gaming platform, other users may create their own games and purposely name their games with the same title as the popular game, may copy and use images from the popular game, etc. (e.g., copycat games, clone games, etc., referred to herein as "imitation games"). Some of these users intend to attract more attention to these imitation games by causing confusion amongst users who may select and play the imitation games in the mistaken belief that the imitation games are the popular game. Such imitation games may be included in search results alongside the popular game or even ahead of the popular game, causing confusion to users searching for the popular game and causing unintentional game sessions to be initiated and/or wasteful follow-up searches.

Features described herein provide search results that are relevant to a search query after determining that the search query is narrowly targeted to a particular game. For example, search queries for a popular game include prominent results that identify a matching popular game, such that users can easily recognize the matching popular game among the search results. This causes imitation games to be comparatively reduced in visibility in the search results, resulting in reduced user confusion. Described features determine whether a search query is directed to a narrow search that targets a particular game, and if so, prominently display (e.g., highlight) that targeted game in a set of search results. For example, in some implementations, a narrow search is determined based at least on game sessions of the games in the search results that have been played by users of the online gaming platform. In some implementations, determination of a narrow search includes consideration of games that include changed titles, e.g., by determining canonical titles for such games that are consistently included in the various titles of the games.

By providing more relevant game search results in response to search queries, disclosed features provide technical advantages including reduction of searches of game data as well as reduction of game session initiations of games not of interest to users, thus causing reduction of use of computational resources (e.g., computer memory, processor, networking traffic, display resources, etc.) used to search for and present search results by devices and used to execute game programs by devices.

FIG. 1 illustrates an example system architecture 100, in accordance with some implementations of the disclosure. The system architecture 100 (also referred to as "system" herein) includes an online gaming platform 102, a first client device 110 (generally referred to as "client devices 110/116" herein), a network 122, and a second client device 116. The online gaming platform 102 can include, among other things, a game engine 104, one or more games 105, a search engine 106, and a data store 108. The client device 110 can include a game application 112. The client system 116 can include a game application 118. Users 114 and 120 can use client devices 110 and 116, respectively, to interact with the online gaming platform 102.

System architecture 100 is provided for illustration. In some implementations, the system architecture 100 may include the same, fewer, more, or different elements configured in the same or different manner as that shown in FIG. 1.

In one implementation, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online gaming platform 102 can include a server having one or more computing devices (e.g., a cloud computing system, a rackmount server, a server computer, cluster of physical servers, virtual server, etc.). In some implementations, a server may be included in the online gaming platform 102, be an independent system, or be part of another system or platform.

In some implementations, the online gaming platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 102 and to provide a user with access to online gaming platform 102. The online gaming platform 102 may also include a website (e.g., one or more webpages) or application back-end software that may be used to provide a user with access to content provided by online gaming platform 102. For example, users may access online gaming platform 102 using the game application 112/118 on client devices 110/116, respectively.

In some implementations, online gaming platform 102 may be a type of social network providing connections between users or a type of user-generated content system that allows users (e.g., end-users or consumers) to communicate with other users via the online gaming platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming platform 102 may be a virtual gaming platform. For example, the gaming platform may provide single-player or multiplayer games to a community of users that may access or interact with games (e.g., user generated games or other games) using client devices 110/116 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may search for games and participate in gameplay with other users in one or more games selected from results of the search. In some implementations, a game selected from results of the search may be played in real-time with other users of the game.

In some implementation, other collaboration platforms can be used with search and presentation features described herein instead of or in addition to online gaming platform 102. For example, a social networking platform, purchasing platform, messaging platform, creation platform, etc. can be used.

In some implementations, gameplay may refer to interaction of one or more players using client devices (e.g., 110 and/or 116) within a game (e.g., 105) or the presentation of the interaction on a display or other output device of a client device 110 or 116.

One or more games 105 are provided by the online gaming platform. In some implementations, a game 105 can include an electronic file that can be executed or loaded using software, firmware or hardware configured to present the game content (e.g., digital media item) to an entity. In some implementations, a game application 112/118 may be executed and a game 105 rendered in connection with a game engine 104. In some implementations, a game 105 may have a common set of rules or common goal, and the environments of a game 105 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 105 may be collectively referred to a "world" or "gaming world" or "virtual world" or "universe" herein. An example of a world may be a 3D world of a game 105. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming platform 102 can host one or more games 105 and can permit users to interact with the games 105 (e.g., search for games, game-related content, or other content) using a game application 112/118 of client devices 110/116. Users (e.g., 114 and/or 120) of the online gaming platform 102 may play, create, interact with, or build games 105, search for games 105, communicate with other users, create and build objects (e.g., also referred to as "item(s)" or "game objects" or "virtual game item(s)" herein) of games 105, and/or search for objects. For example, in generating user-generated virtual items, users may create characters, decoration for the characters, one or more virtual environments for an interactive game, or build structures used in a game 105, among others.

In some implementations, users may buy, sell, or trade game virtual game objects, such as in-platform currency (e.g., virtual currency), with other users of the online gaming platform 102. In some implementations, online gaming platform 102 may transmit game content to game applications (e.g., 112). In some implementations, game content (also referred to as "content" herein) may refer to any data or software instructions (e.g., game objects, game, user information, video, images, commands, media item, etc.) associated with online gaming platform 102 or game applications. In some implementations, game objects (e.g., also referred to as "item(s)" or "objects" or "virtual game item(s)" herein) may refer to objects that are used, created, shared or otherwise depicted in game applications 105 of the online gaming platform 102 or game applications 112 or 118 of the client devices 110/116. For example, game objects may include a part, model, character, tools, weapons, clothing, buildings, vehicles, currency, flora, fauna, components of the aforementioned (e.g., windows of a building), and so forth.

It may be noted that the online gaming platform 102 hosting games 105, is provided for purposes of illustration, rather than limitation. In some implementations, online gaming platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 105 may be associated with a particular user or a particular group of users (e.g., a private game), or made widely available to users of the online gaming platform 102 (e.g., a public game). In some implementations, where online gaming platform 102 associates one or more games 105 with a specific user or group of users, online gaming platform 102 may associated the specific user(s) with a game 105 using user account information (e.g., a user account identifier such as username and password).

In some implementations, online gaming platform 102 or client devices 110/116 may include a game engine 104 or game application 112/118. The game engine 104 can include a game application similar to game application 112/118. In some implementations, game engine 104 may be used for the development or execution of games 105. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.). In some implementations, game applications 112/118 of client devices 110/116, respectively, may work independently, in collaboration with game engine 104 of online gaming platform 102, or a combination of both.

In some implementations, both the online gaming platform 102 and client devices 110/116 execute a game engine (104, 112, and 118, respectively). The online gaming platform 102 using game engine 104 may perform some or all the game engine functions (e.g., generate physics commands, rendering commands, etc.), or offload some or all the game engine functions to game engine 104 of client device 110. In some implementations, each game 105 may have a different ratio between the game engine functions that are performed on the online gaming platform 102 and the game engine functions that are performed on the client devices 110 and 116. For example, the game engine 104 of the online gaming platform 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming platform 102 and client device 110 may be changed (e.g., dynamically) based on gameplay conditions. For example, if the number of users participating in gameplay of a game 105 exceeds a threshold number, the online gaming platform 102 may perform one or more game engine functions that were previously performed by the client devices 110 or 116.

For example, users may be playing a game 105 on client devices 110 and 116, and may send control instructions (e.g., user inputs, such as right, left, up, down, user election, or character position and velocity information, etc.) to the online gaming platform 102. Subsequent to receiving control instructions from the client devices 110 and 116, the online gaming platform 102 may send gameplay instructions (e.g., position and velocity information of the characters participating in the group gameplay or commands, such as rendering commands, collision commands, etc.) to the client devices 110 and 116 based on control instructions. For instance, the online gaming platform 102 may perform one or more logical operations (e.g., using game engine 104) on the control instructions to generate gameplay instruction for the client devices 110 and 116. In other instances, online gaming platform 102 may pass one or more or the control instructions from one client device 110 to other client devices (e.g., 116) participating in the game 105. The client devices 110 and 116 may use the gameplay instructions and render the gameplay for presentation on the displays of client devices 110 and 116.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming platform 102. In other implementations, the control instructions may be sent from a client device 110 to another client device (e.g., 116), where the other client device generates gameplay instructions using the local game engine 104. The control instructions may include instructions to play a voice communication message or other sounds from another user on an audio device (e.g., speakers, headphones, etc.).

In some implementations, gameplay instructions may refer to instructions that allow a client device 110 (or 116) to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game 105. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools. In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming platform 102. In some implementations, creating, modifying, or customizing characters, other game objects, games 105, or game environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online gaming platform 102 may store characters created by users in the data store 108. In some implementations, the online gaming platform 102 maintains a character catalog and game catalog that may be presented to users via. In some implementations, the game catalog includes images of games stored on the online gaming platform 102. In addition, a user may select a character (e.g., a character created by the user or other user) from the character catalog to participate in the chosen game. The character catalog includes images of characters stored on the online gaming platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online gaming platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the game application 112 or 118, respectively. In one implementation, the game application 112 or 118 may permit users to use and interact with online gaming platform 102, such as search for a game or other content, control a virtual character in a virtual game hosted by online gaming platform 102, or view or upload content, such as games 105, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 or 116 and allows users to interact with online gaming platform 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 112/118 may be an online gaming platform application for users to build, create, edit, upload content to the online gaming platform 102 as well as interact with online gaming platform 102 (e.g., play games 105 hosted by online gaming platform 102). As such, the game application 112/118 may be provided to the client device 110 or 116 by the online gaming platform 102. In another example, the game application 112/118 may be an application that is downloaded from a server.

In some implementations, a user may login to online gaming platform 102 via the game application. The user may access a user account by providing user account information (e.g., username and password) where the user account is associated with one or more characters available to participate in one or more games 105 of online gaming platform 102.

In general, functions described in one implementation as being performed by the online gaming platform 102 can also be performed by the client device(s) 110 or 116, or a server, in other implementations if appropriate. In addition, the functionality attributed to a particular component can be performed by different or multiple components operating together. The online gaming platform 102 can also be accessed as a service provided to other systems or devices through appropriate application programming interfaces (APIs), and thus is not limited to use in websites.

In some implementations, online gaming platform 102 may include a search engine 106. In some implementations, the search engine 106 may be a system, application, or module that permits the online gaming platform 102 to provide search functionality to users, where the search functionality permits the users to search for games, game-related content or other content within the online gaming platform 102. In some implementations, the search engine 106 may perform one or more of the operations described below in connection with the flowcharts shown in FIGS. 2 and 3.

Figure 2:
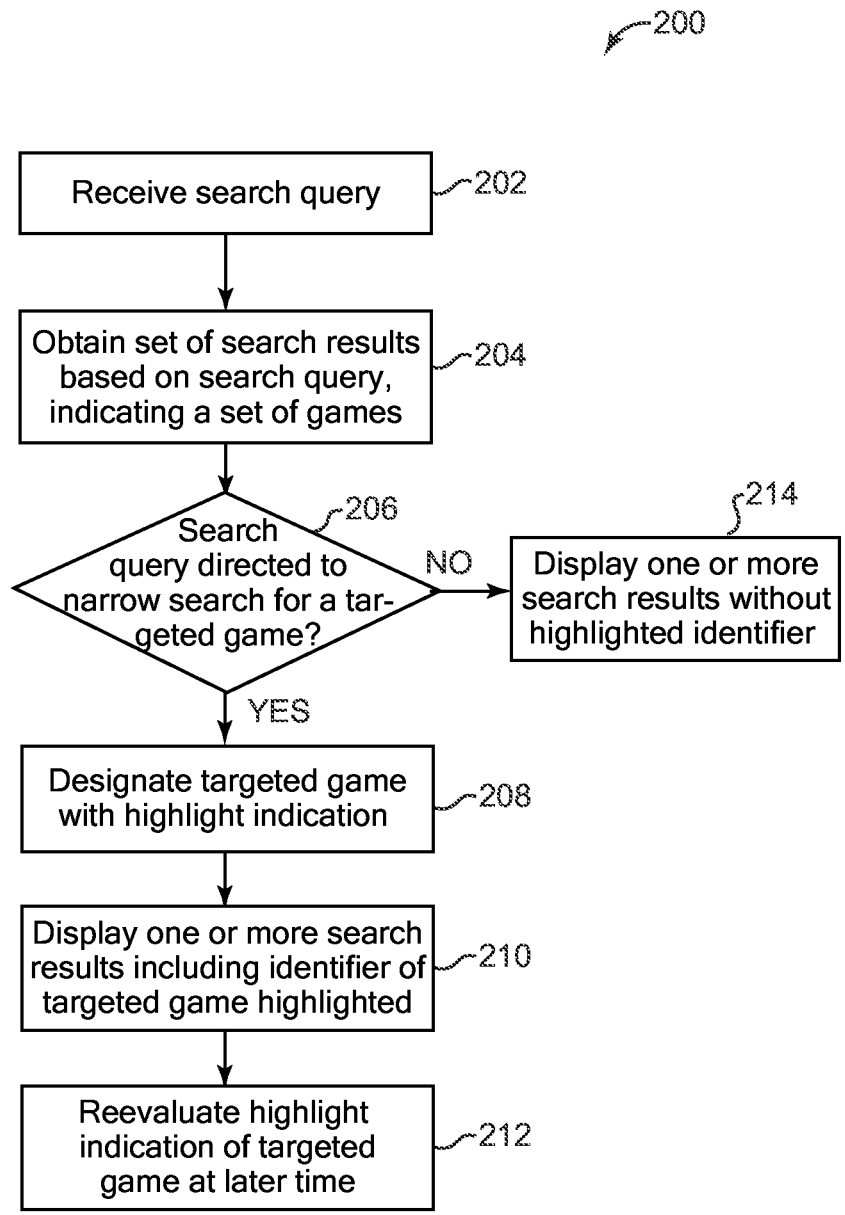
FIG. 2 is a flow diagram of an example method of providing prominent display of a targeted game in search results, in accordance with some implementations.

FIG. 2 is a flow diagram of an example method 200 of providing prominent display of a targeted game in search results, in accordance with some implementations. In some implementations, method 200 can be implemented, for example, on a server system, e.g., online gaming platform 102 as shown in FIG. 1. In some implementations, some or all of the method 200 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 200.

In block 202, a search query is received, e.g., at a server. For example, a user (e.g., user 114) can input a search query to a game application 112 executing on a client device 110, and the search query is sent to a server (e.g., online gaming platform 102), resulting in receiving the search query at the server. Alternatively, a different application on client device 110 can receive the search query. The search query can include one or more terms (e.g., keywords) that a user is searching for, where the terms are related to one or more games and/or game-related content within an online gaming platform (e.g., 102) or other system. For example, the terms can refer to a game title, a subject of a game (e.g., "racing"), an environment (e.g., "underwater"), names of characters or objects in the game, etc. Processing continues to block 204.

In block 204, a set of search results is obtained, where the search results are based on the search query. The search query is executed against a data store, e.g., the search query is searched for within the data store. The data store includes data descriptive of available games, which can include user generated games and/or non-user generated games. In some implementations, the data store may also include other data such as game-related content (e.g., avatars, objects, etc. for use in games) and non-user generated content (e.g., game related content). The data store also includes content or information associated with a game such as one or more of game title, game type, name of game developer or creator, game first availability time, game most recent version availability time, or game popularity. The data store can index items by keyword, recency timestamp, or other field. The obtaining of search results can include matching game characteristics based on terms of the search query and returning the best matches, e.g., the matches most similar to the game characteristics.

In some implementations, other search parameters may be used to perform the search, such as parameters received with the search query. Parameters can include selections made by a user when the search is being requested (e.g., type of content to search for, include user generated or non-user generated content in the results, and/or other parameters suitable to help narrow the range of results returned from the search). For example, the parameters may be associated with a graphical user interface provided as a search interface.

A set of games is indicated in the search results, which is a subset of the available games searched in the data store. For example, the set of games can be designated by titles of games that have one or more characteristics that match the search query. The games can be associated with other data, e.g., one or more images (e.g., screenshots of the game), creator or designer (e.g., a user name), time of creation and/or last modification, and other data. Processing continues to 206.

In block 206, it is determined whether the search query is directed to a narrow search for a particular game ("targeted game") of the set of games in the search results. This determination is made based on one or more characteristics of the games identified in the set of search results obtained in block 204. A narrow search, as referred to herein, is a targeted search for a specific game, e.g., a "navigational" search. For example, a user that input the search query may be looking for a targeted game that the user has in mind, which can be considered a narrow search. In contrast, a broad search, as referred to herein, is a non-narrow search that is considered to broadly search for multiple (or any) available games having characteristics that match one or more terms of the search query, and/or matches a semantic meaning of one or more terms of the search query. It is determined at block 206 whether the search query is directed to a narrow search for a targeted game or a broad search for related games. For example, this determination can be made based on the input search query terms (and the obtained search results and related data as described herein), and need not be based on any additional information input by the user in association with the search query that indicates user intent (e.g., the user does not need to provide additional input for the search query that indicates that it is a narrow or broad search). Some example implementations of block 206 are described below with respect to FIG. 3.

If it is determined in block 206 that the search query is directed to a narrow search, then the method continues to block 208, where the targeted game to which the search query is directed, as determined in block 206, is designated with a highlight indication. For example, the targeted game can be associated with a flag or other indicator stored in association with an identifier of the targeted game, where the highlight indicator indicates that the game has been determined to be the target of the narrow search of the search query of block 202, and that an identifier of the targeted game is to be highlighted when displayed in search results for the query. In some implementations, the search query of block 202 is also stored in association with the highlight indication. In some implementations, particular highlight characteristics can also be stored in association with the highlight indicator, e.g., parameters indicating the characteristics of the highlighted identifier of the targeted game. For example, the size of text or images for a displayed identifier of the targeted game identifier, location of displaying the targeted game identifier within a list or display area, or other characteristics can be specified by the highlight indicator. In some implementations, such highlight characteristics can be determined based on stored user preferences that were previous selected by the user, and/or instructed by the user for the search query (e.g., as commands, selections in a GUI, etc.). Processing continues to 210.

In block 210, one or more of the search results are displayed. For example, the search results can be displayed in game application 112 used to receive the search query, and/or can be displayed in a web page, a media viewer, etc. The one or more displayed search results can be a subset of the set of games obtained in block 204, or can include all of the set of games. In some example implementations, a device that designates the targeted game with a highlight indication as in block 208, such as a server, transmits the obtained search results (or a subset thereof) and the highlight indication to a client device, and the client device displays one or more of the search results and uses the highlight indication to determine which search results to highlight.

The displayed search results include identifiers of the games associated with the search results, e.g., one or more of the set of games obtained in block 204. The search results can be displayed according to any of a variety of criteria. For example, the identifiers can be displayed in an order based on popularity of the associated games (e.g., number of downloads, user rating, number of times played, etc.), recency of creation or upload of the associated games to the gaming platform, recency of the last sessions played by users of the associated games, how many times a user clicked on a game search result, etc. Each identifier of a game can include text, images (including static images, video, animated images, icons, emojis, etc.), and/or audio (e.g., audio output identifies the targeted game when directed by user input). In some examples, an identifier can include text that is the title of the associated game, an icon, logo, or symbol associated with the game, images of objects from the game, and/or screenshots (or portions thereof) from the game.

The displayed search results include an identifier of the targeted game that is displayed highlighted relative to identifiers of all of the other (non-highlighted) games in the displayed search results, e.g., displayed prominently compared to the other search results. As with the other identifiers, the highlighted identifier of the targeted game can include text, images (including static images, video, animated images, icons, emojis, etc.), and/or audio. In some examples, the highlighted identifier can include text that is the title of the targeted game, an icon, logo, or symbol associated with the targeted game, images of objects from the targeted game, and/or screenshots (or portions thereof) from the targeted game.

In some examples, the highlighting of the identifier can include any of a variety of different types of highlighting, including a displayed size of identifier text, symbols, or images that is larger than other search results, different colors for the identifier than for other search results, indicators such as arrows, stars, colors, and/or symbols that point to or otherwise designate the identifier, underlining, italics, different fonts, or other modifications of the text of the identifier, etc. In some examples, the highlighting can include displaying the targeted game with video or animated images (in contrast to static images for the other search results), audio (in contrast to no audio for other search results), etc.

In some implementations, the highlighting can include displaying the identifier in a highlight slot in the user interface that visually emphasizes the identifier relative to the other search results. For example, the highlight slot can be at the first position of a list of search results, such as the top of the list of search results or the top of a display area of the user interface, or at the left, right, or bottom of the display area, e.g., depending on settings of the device (e.g., language settings, screen orientation, shape, size, etc.). In some implementations, the position of the highlight slot in a display area of the user interface can otherwise be selected to attract a user's attention.

In some implementations, after display of block 210, and/or after exit of the user from the search engine or search interface for the search query of block 202, the highlight indication associated with the targeted game is removed and no longer associated with the targeted game. In some implementations, the highlight indication is persistent, e.g., retained in storage in association with the targeted game and the search query of block 202. The persistent highlight indication can be used for a period of time after block 210 and/or for later search queries that match the search query. Processing continues to block 212, in some implementations.

In some implementations, block 212 can be performed to reevaluate a highlight indication of the targeted game at a later time, e.g., if the highlight indication is persistent. Block 212 is described below.

If it is determined in block 206 that the search query is not directed to a narrow search (e.g., is directed to a broad search), the method continues to block 214, where one or more search results of the set of search results are displayed without highlighting a targeted game as described with reference to block 210. For example, the search results can include identifiers that are displayed in any of a variety of orders and arrangements, similarly as described above. Since no targeted game was determined in block 206, none of the search results are highlighted in the manner described for block 210. For example, the search results can be transmitted to a client device (e.g., from a server) without the highlight indication described above, or with an indication of absence of highlighting.

After display of the search results in block 210 or block 214, the user interface can provide other functions as provided by the device displaying the search results. For example, the user can select one of the search results via user input (e.g., via a touchscreen or other user input device), which causes the device to initiate the game associated with the selected search result such that the user is a player in the associated game. For example, the display of the device can change to display game output from game application 112 (or 118) and the device is receptive to user input to influence states of the game. Other functions can also or alternatively be provided by the device in response to user selection of a search result, e.g., displaying additional information about a selected game, communicating via a communication network with a creator of the selected game, etc.

In some implementations, the highlight indication of block 208 can be at least partially persistent for a period of time and/or based on one or more other conditions being satisfied. The persistent highlight indication can indicate to highlight the targeted game for subsequent search queries that match the search query of block 202. This can allow, for example, avoiding performing at least some portions of method 200 for some subsequent search queries, where the system refers to the highlight indication to determine which search result to highlight based on the processing of method 200 in a previous search having the same search query.

In some implementations, the entire method 200 can be fully performed periodically, or repeatedly after a particular number of search queries (e.g., a particular number of the same search queries, or alternatively a particular number of any search queries). Such full performance of method 200 causes the targeted game and a highlight indication to be again determined. In some implementations, such full performances of method 200 can be made by the system periodically, e.g., even if no search query is received, to update the persistent highlight indication that was previously determined for a targeted game.

Block 212 can be performed in some implementations to reevaluate the highlight indication of the targeted game. For example, block 212 can be performed if the highlight indication is persistent after block 210. Block 212 can be performed at a time after the search results have been displayed in block 210, e.g., according to a periodic time interval (e.g., each day or week). In some implementations, block 212 can be performed in response to one or more subsequent search queries after the display of search results in block 210.

In block 212, the blocks 202-210 and 214 of method 200 are performed in a later iteration using the same search query and one or more different criteria from the previous iteration, to determine whether the targeted game still qualifies to be highlighted in search results or should no longer be highlighted (and if it should be no longer highlighted, the highlight indication is removed from association with the targeted game).

In some examples, the different criteria can include one or more different thresholds, e.g., thresholds as described below with reference to block 306 to determine whether the search query is directed to a narrow search and to determine the targeted game being searched. In some implementations, the different thresholds used in later iterations can be stricter or more constrained that previously-used thresholds, e.g., making it more difficult for a search query to qualify as a narrow search and/or more difficult for a game to qualify as the particular (targeted) game. In some examples, the threshold number of qualifying sessions for a game is 70% initially to qualify as the targeted game of a narrow search in block 306. In subsequent iterations of method 200 via block 212, the threshold number of qualifying sessions can be increased, e.g., to 80%. For example, an initial threshold can be made easier to satisfy to give games an easier chance to qualify as a targeted game. However, to remain as the targeted game, a game must satisfy a stricter threshold in later iterations of method 200, thus indicating that the game maintains its interest to users over time for the search query. Thus, after processing a second set of search results in the later iteration with stricter threshold(s), if the previous targeted game does not meet the stricter threshold(s), the highlight indication is removed from its association with that game so that the game is no longer the targeted game for the search query. If a different game meets the threshold(s) to be the targeted game, a highlight indication is created in association with that game.

In some examples, the stricter thresholds can be used a particular amount of time after the initial performance of method 200 (e.g., after the initial designation as the targeted game). In some implementations, one or more thresholds in later iterations processing the search query can be made less strict, e.g., to allow a search query to qualify as a narrow search and/or a game to more easily qualify as a targeted game.

Blocks 202-214 can be performed (or repeated) in a different order than described above and/or one or more blocks can be omitted.

Figure 3:
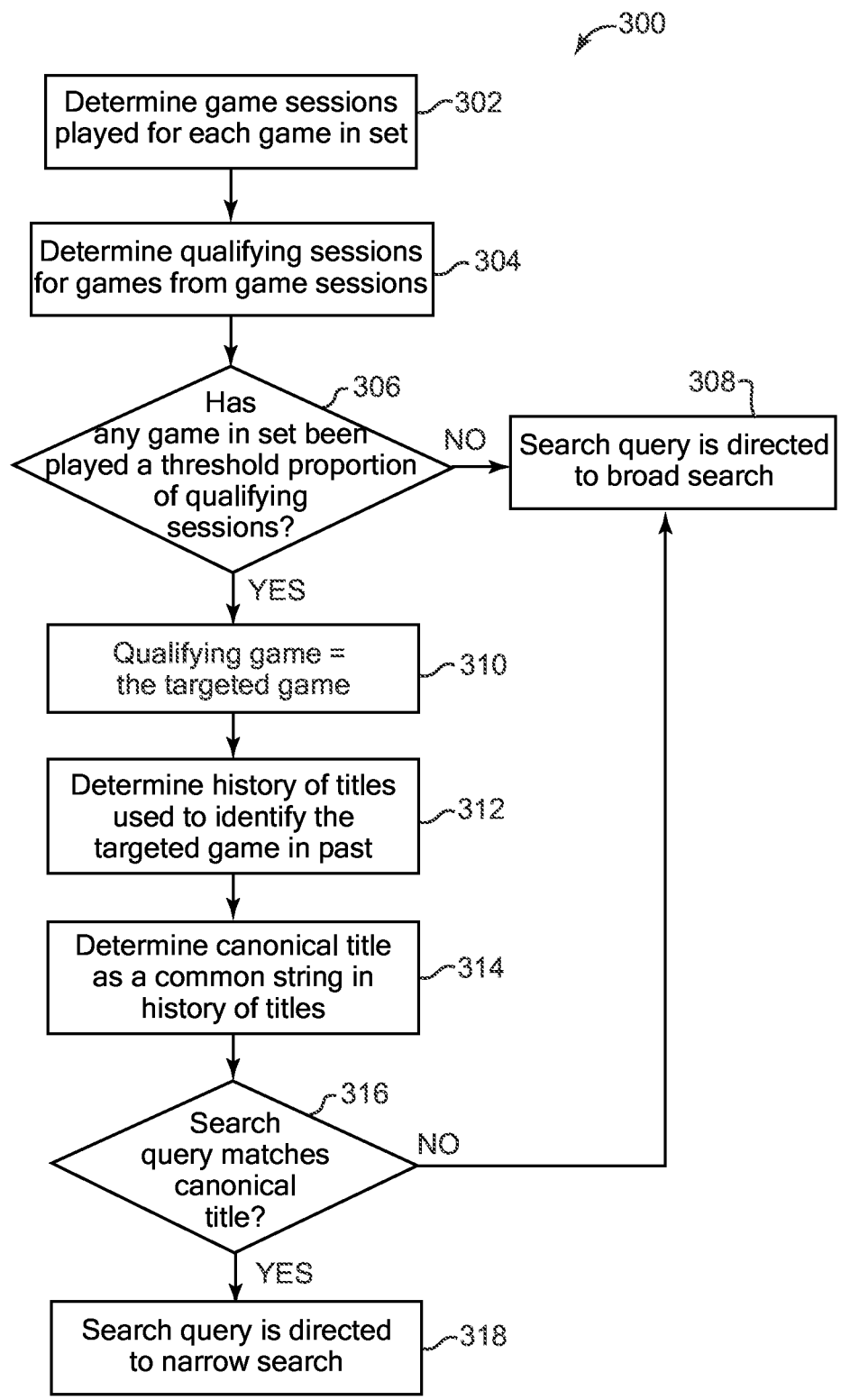
FIG. 3 is a flow diagram of an example method to determine if a search query is directed to a narrow search, in accordance with some implementations.

FIG. 3 is a flow diagram illustrating an example method 300 to determine if a search query is directed to a narrow search, according to some implementations. For example, method 300 may be used to implement block 206 of the example method 200 of FIG. 2.

In block 302, game sessions are determined for each game in a set of games. For example, the set of games can be the set of games as search results obtained in block 204 of FIG. 2 in response to receiving a search query. The game sessions are instances in which a user played the game, e.g., connected to a server and initiated or joined a game session, and exited the game session at a later time. The number of game sessions played for each game of the set of games can be determined in block 302. Other characteristics of the game sessions can also be determined in block 302, e.g., the time that each game session started and/or ended, the duration of each game session, the number of users participating in each game session, etc. The game sessions can be determined based on a dataset retrieved from a data store that stores game session data for each game available on the online gaming platform, including the games in the set of games.

In block 304, qualifying sessions are determined from the game sessions determined in block 302. For example, each game session of each game is determined as to whether it is a qualifying session or not. Qualifying sessions are game sessions that meet particular conditions and which are used in later blocks of method 300 to determine whether the search query is directed to a narrow search. Qualifying sessions can be determined in any of several different ways based on one or more conditions.

In some examples, a qualifying session is based on an amount of time that the session is active, e.g., a time duration that a user played the game in a game session. For example, the system determines whether the duration that a game session is active meets a threshold amount of time. The threshold amount of time can be an amount of time that indicates the user has engaged with the game and is not, for example, initiating the game and immediately exiting the game. For example, the threshold amount of time can be 5 minutes, 10 minutes, etc. If the session duration meets the threshold amount of time, the game session is identified as a qualifying session, and if the duration does not meet the threshold amount of time, the game session is identified as a non-qualifying session.

In further examples, a qualifying session is based on the recency of the game session, e.g., the amount of time that has passed since the game session occurred. For example, game sessions that occurred (e.g., started or ended) within a threshold amount of time from the current time can be identified as qualifying sessions, and game sessions that occurred more than the threshold time can be identified as non-qualifying sessions.

In further examples, a qualifying session is based on an initiation method used by the user to initiate the game and/or game session. For example, one initiation method can be the user selecting an identifier of the game in displayed set of search results resulting from a previous search query input to the online gaming platform, such that the selection causes the associated game to initiate and the user device to automatically join a game session of the game. In some implementations, if a game session was initiated based on selection of a previous search result from a previous search query input to the online gaming platform, the session is identified as a qualifying session. If the session was not initiated by the selection of the previous search result from the previous search query input to the server (e.g., not initiated by selection of any previous search result to any previous search query), the session is identified as a non-qualifying session. Requiring such an initiation method for a qualifying session allows the system to determine the game sessions that were initiated from selection of search results. In some implementations, such game sessions may be given greater weight than game sessions initiated via other initiation methods. Other initiation methods that can be required for qualifying sessions can include, for example, selecting the game via an identifier (e.g., icon or menu item) displayed in a user interface, selecting a game identifier or link in a web page, receiving an invitation from a different user or from the online gaming platform, etc.

In further examples, a qualifying session is based on whether particular activities were performed by a user in the game and during the game session. For example, the system can determine whether the user of the session performed a threshold number of activities during the game session. If the user performed the threshold number of activities during the session, the session is identified as a qualifying session, and if the user did not perform the threshold number of activities during the session, the session is identified as a non-qualifying session. Example activities can include communicating with another user in the game session, purchasing one or more game items via the game interface during the game session, initiating an in-game tutorial, or other activities indicating engagement of the user with the game session.

In some implementations, two or more conditions are used to determine whether a game session is a qualifying session. For example, the duration of the game session and the initiation method, as described above, can both be checked such that a qualifying session must satisfy both of these conditions.

In some implementations, game sessions can be assigned weights of different values based on whether they are qualifying sessions or non-qualifying sessions. For example, qualifying sessions can be assigned higher weights than non-qualifying sessions. Some implementations can assign a value from a range of weight values based on a determined magnitude of qualification of a game session. For example, a game session that was active for a longer duration can be assigned a higher weight than a game session that was active for a shorter duration (where both of these durations may be qualifying durations that are over the threshold amount of time).

In block 306, it is determined whether any game in the set of games has been played a threshold proportion of the total number of qualifying sessions amongst the games of the set of games. A game that was played for the threshold proportion of qualifying sessions had the most qualifying sessions amongst the set of games that satisfied the search query. In some implementations, the threshold proportion can be a value (e.g., percentage) that is sufficiently high such that the associated game was played in more qualifying sessions than other games in the set of games, and also sufficiently high to indicate that the associated game was played in significantly more qualifying sessions than any other games in the set of games that satisfied the search query. In some examples, a threshold proportion can be 75%, 80%, or other high percentage value, such that all of the other games in the set of games were played in the remaining percentage of qualifying sessions (e.g., 25% or 20%).

In some implementations, multiple games may qualify by having been played in the threshold proportion of total qualifying sessions. For example, if the threshold proportion is 25%, three or four games may qualify. In some implementations, multiple qualifying games can be different versions of a targeted game, e.g., updated versions, expansions, or other games related to the targeted game.

If it is determined in block 306 that no game in the set of games has been played the threshold proportion of the total qualifying sessions, the method continues to block 308, where it is determined that the search query that provided the set of games (e.g., of block 202 of FIG. 2) is directed to a broad search, e.g., a non-narrow search that did not target a specific game. In some examples, the process continues to the negative result of block 206 of FIG. 2, e.g., to block 214, in which none of the games identifiers in the search results are highlighted.

If it is determined in block 306 that a game (qualifying game) in the set of games has been played the threshold proportion of the total qualifying sessions, the method continues to block 310, where that qualifying game is designated as the targeted game.

In some implementations, a narrow search may be identified based on the positive result of block 306, e.g., as a result from determining that a game qualifies in the conditions of block 306 (as indicated in block 310).

In other implementations, additional processing may be performed in addition to blocks 306 and 310 to determine whether the search query is directed to a narrow search. For example, in example method 300, the method continues to block 312 after block 310 to perform such additional processing.

In block 312, a history of titles is determined for the targeted game, where the history of titles indicates different titles that were used to identify the targeted game in the past, e.g., over time in a history of availability of the game to users of the online gaming platform. For example, in some online gaming platforms, titles of user-created games can be changed at any time by that user or other authorized user, and/or titles of a game may be changed by including different version numbers of the game, such that a game's title may have several changes over time. These changes are stored by the online gaming platform and are accessed in block 312. For example, in some implementations, a background process or job can be executing on the online gaming platform that tracks the versioning and title changes of all the games available on the online gaming platform. Some implementations can store versioning and title changes of games made by user creators via a user interface that allows a user to indicate that a new version and/or title change has been made to a game.

In block 314, a canonical title is determined for the targeted game, where the canonical title is a base title that is considered to identify the game in any of its different versions (if applicable). For example, the canonical title can be determined by comparing the different titles determined for the game in block 312 and finding a common string portion among these titles. For example, if the historical titles of the targeted game are "Peep City," "Peep City 2.0," and "Peep City New Update," the common string portion is "Peep City." The common string portion is designated to be the canonical title of the targeted game.

In block 316, it is determined whether the search query matches the canonical title determined in block 314. For example, the search query can be the search query received in block 202 of FIG. 2. In some implementations, the system can check for an exact match, e.g., both search query and canonical title having all of the same characters. In some implementations, the match can be an inexact match, e.g., ignoring spaces or punctuation, or looking for a match of at least a portion of the search query to the canonical title.

If the search query is determined to match the canonical title, the method continues to block 318, in which it is determined that the search query is directed to a narrow search, which is a search specifically targeting the targeted game. In some examples, the method can then return to block 208 of FIG. 2 as the positive exit of block 206.

If the search query is determined to not match the canonical title (e.g., there is absence of a match), the method continues to block 308, in which it is determined that the search query is directed to a broad search, e.g., a non-narrow search that did not target a specific game. In some examples, the method can then return to block 214 of FIG. 2 as the negative exit of block 206.

In some implementations, blocks 312, 314, and 316 can be performed for all of the games in the set of games, and/or for all of the available games on the online gaming platform, in addition to being performed for the targeted game. For example, this allows the method to perform these blocks for the set of games or the available games prior to or at least partially simultaneously to the performance of blocks 302, 304, 306, and/or 310. For example, in some implementations this allows a canonical title check to be performed for the set of games as a way to filter out games that do not have a canonical title that matches the search query. For example, games that do not have a matching canonical title can be removed from consideration in the processing of block 306.

Blocks 302-316 can be performed (or repeated) in a different order than described above and/or one or more blocks can be omitted. Methods 200 and/or 300 can be performed on a sever (e.g., 102) and/or a client device (e.g., 110 or 116).

Figure 4:
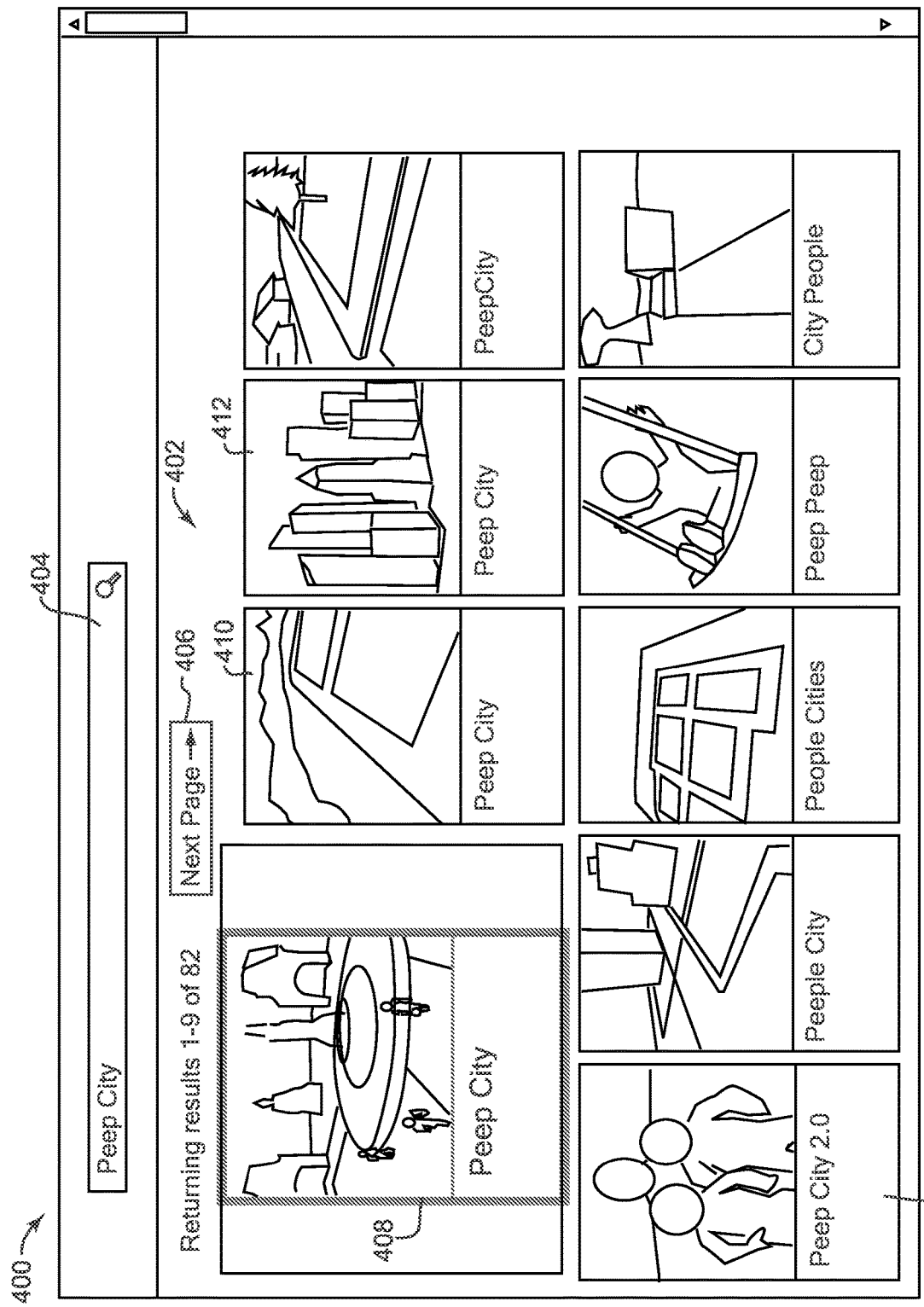
FIG. 4 is an example graphical user interface displaying search results based on a search query determined to request a narrow search, in accordance with some implementations.

FIG. 4 is an example graphical user interface (GUI) 400 displaying search results 402 based on a search query determined to request a narrow search, in accordance with some implementations. GUI 400 includes a display of a first portion (e.g., page 1) of search results that identify games that have been matched with the search query "Peep City" that has been input in search field 404. GUI 400 includes an element 406 that, when selected, causes a request to retrieve a next portion of results (e.g., page 2, etc.) to be sent and displayed in GUI 400. In some implementations, when element 406 is selected, the system sends a request for the next portion of search results including an identification of the requested next portion (e.g., page 2, etc.).

The search results have been processed as described herein to determine whether the search query is directed to a narrow search for a targeted game, or a broad search. In this example, it has been determined that a narrow search for the game identified by game identifier 408 ("Peep City") is being requested. This targeted game is assigned a highlight indicator and its identifier is presented in GUI 400 with other game identifiers obtained in the search results, where game identifier 408 is highlighted so as to be displayed prominently relative to the other search results 402. In this example, highlighted game identifier 408 is displayed at the top of the search results (e.g., in the upper-left position of a search results display area, in this example), is displayed of a slightly larger size, and is displayed with a larger border to visually emphasize the game identifier. The search results other than the highlighted search result are displayed in an order based on one or more criteria, e.g., popularity, number of players currently playing the game, recency of last game session, etc.

The game identifier 408 is determined as the target of a narrow search based on, e.g., previous game sessions of the games identified in the search results as well as comparisons of a canonical title to the search query. For example, the game associated with highlighted game identifier 408 was determined to have had a threshold number of qualifying game sessions. Furthermore, it's canonical title ("Peep City") is determined to match the search query. Other search results, such as the games associated with game identifiers 410, 412, and 414, also have a canonical title that matches the search query, but were not associated with the threshold number of qualifying game sessions. Other implementations can use other conditions for determining the targeted game of a narrow search, as described herein.

Figure 5:
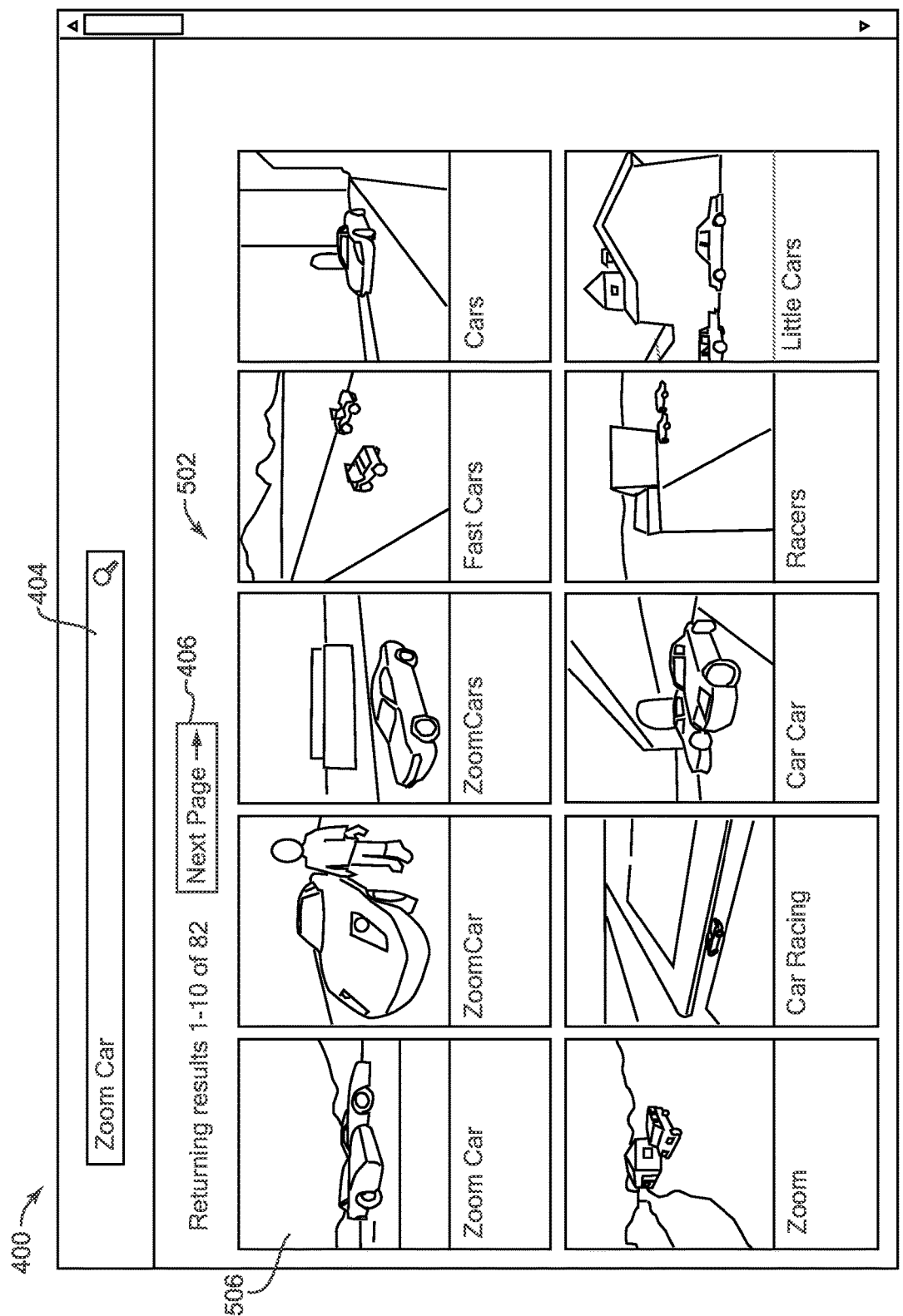
FIG. 5 is an example graphical user interface displaying search results based on a search query determined to request a broad search, in accordance with some implementations.

FIG. 5 shows another example of graphical user interface (GUI) 400 of FIG. 4, displaying different search results 502 based on a search query determined to request a broad search, in accordance with some implementations. GUI 400 includes a display of a first portion (e.g., page 1) of search results that identify games that have been matched with the search query "Zoom Car" input in search field 404.

The search results have been processed as described herein to determine whether the search query is directed to a narrow search for a targeted game, or a broad search. In this example, it has been determined that a broad search is being requested. Thus, the search results are displayed in an order based on one or more criteria, e.g., popularity, number of players currently playing the game, recency of last game session, etc., without any of the search result game identifiers being highlighted.

The broad search can be determined based on, e.g., played game sessions of the games identified in the search results as well as comparisons of a canonical title to the search query, as described above. For example, no game identified in search results for the search query in field 404 of FIG. 5 is determined to have had a threshold number of successful game sessions, despite one game (identified by identifier 506) having a canonical title ("Zoom Car") that exactly matches the search query. Other implementations can use other conditions for determining a narrow search or broad search, as described herein.

In some implementations, one or more other techniques can be used to determine whether a search query is directed to a narrow search for a targeted game. For example, one or more machine learning models, clustering analysis of data, and/or heuristics can be used. Some implementations can use a trained machine learning model based on training data of previous searches performed by users, and/or based on training data that is created for training purposes. In some examples of an unsupervised machine learning technique, a number of top search queries that have been input (e.g., top queries based on frequency, popularity, recency, and/or other criteria) are selected and a set of search results is obtained for each search query. The set of search results is sorted based on number of played game sessions to obtain a graph. A power law distribution is fit to the graph, where a coefficient, e.g., alpha, describes the power law distribution. Each query is associated with an alpha based on the power law distribution of its search results. The search queries are clustered and segmented into two clusters using K-means clustering, where one cluster represents broad search queries and the other cluster represents narrow search queries. For example, a higher alpha indicates that the search is more likely to be narrow. An alpha line can be drawn in the K-means clustering, where the alpha line is a line along which segmentation is performed into the narrow and broad clusters, and a search query is determined as broad or narrow based on its alpha.

For a new search query, its search results are determined and a power law distribution and alpha are determined for the search results. The alpha determined for the search query is compared to the alpha line of the clustering to determine if the alpha is above or below the alpha line (e.g., k-means deciding line). If the new search query's distribution, based on its alpha, is above the threshold alpha line, the query is indicated to be directed to a narrow search, otherwise it is indicated to be directed to a broad search. The alpha line can be dynamically determined and may change over time based on additional search query data. In addition, in some implementations, after deciding that the query is narrow, additional processing can be performed. For example, a canonical title of the targeted game can be checked for a match to the search query, as described above. In some implementations, other determinations based on the history of game sessions (as described with reference to FIG. 3), e.g., threshold popularity, recency, etc. can also be determined to indicate a narrow search for a targeted game.

In some implementations, one or more techniques described herein can be used for searching of other items or other types of results. For example, a search for game resources (e.g., game objects, characters, game modes, etc.), users, developers, etc. can use similar techniques to determine if a narrow search is directed and to prominently display a targeted game targeted by the narrow search.

Figure 6:
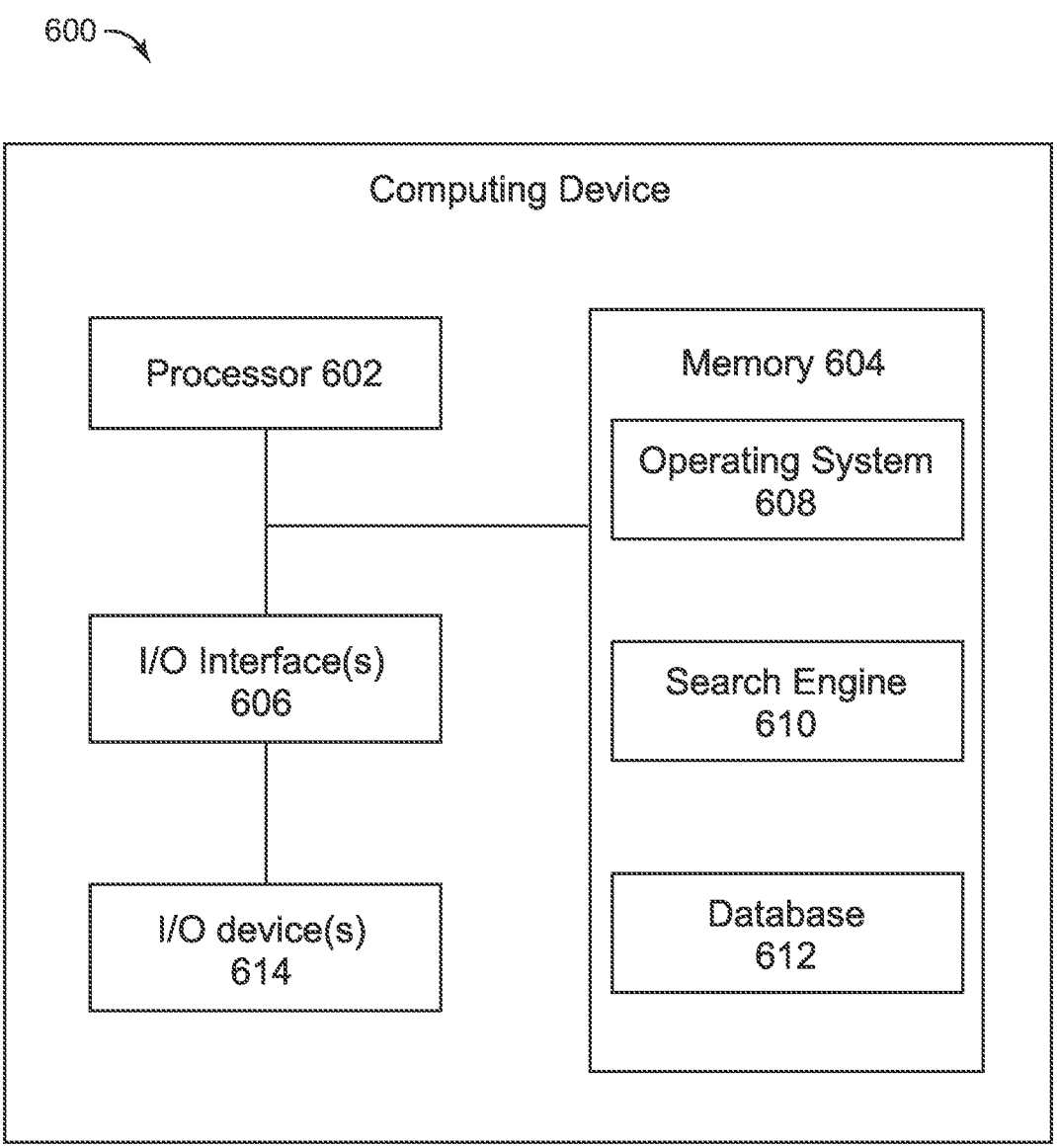
FIG. 6 is a block diagram illustrating an example computing device which may be used to implement one or more features described herein, in accordance with some implementations.

FIG. 6 is a block diagram of an example computing device 600 which may be used to implement one or more features described herein, in accordance with some implementations. In one example, device 600 may be used to implement a computer device, (e.g., 102, 110, and/or 116 of FIG. 1), and perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614 (e.g., display screen, touchscreen, display goggles or glasses, audio speakers, microphone, etc.).

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, a search engine application 610 and associated data 612. In some implementations, the search engine application 610 can include instructions that enable processor 602 to perform the functions described herein, e.g., some or all of the methods of FIGS. 2 and 3.

For example, memory 604 can include software instructions for a search engine 610 that can provide search with improved discoverability within an online gaming platform (e.g., 102). Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 108), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 6 shows one block for each of processor 602, memory 604, I/O interface 606, software blocks 608 and 610, and database 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While the online gaming platform 102 is described as performing operations as described in some implementations herein, any suitable component or combination of components of online gaming platform 102 or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 200 and/or 300) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   determining, by at least one server processor of an online gaming platform, a respective canonical title of each game in a data store of available games that are accessible to be played on the online gaming platform;
   receiving, at the at least one server processor, a search query from a user device;
   executing, by the at least one server processor, the search query against the data store of available games to obtain search results from the data store, wherein the search results indicate a set of games of the available games that are matched to the search query;
   determining, by the at least one server processor, whether the search query is directed to a narrow search for a particular game of the set of games based on:
      determining whether the search query matches the canonical title of the particular game;
      determining, by the at least one server processor, qualifying sessions of respective games of the set of games played by the users of the online gaming platform, wherein the qualifying sessions are a subset of sessions of the set of games played by the users; and
      determining, by the at least one server processor, that a played game of the respective games qualifies as the particular game of the narrow search based on the played game having been played for a threshold proportion of the qualifying sessions of the respective games, wherein the played game has the most qualifying sessions amongst the set of games,
         wherein determining the qualifying sessions includes:
            obtaining, by the at least one server processor, a dataset comprising sessions of each game of the set of games; and
            for each session of each game of the set of games:
               determining, by the at least one server processor, whether the session was initiated in response to selection of a previous search result from a previous search query input to the server processor, wherein the previous search result identifies the game; and
               in response to determining that the session is initiated in response to the selection of the previous search result, identifying, by the at least one server processor, the session as one of the qualifying sessions;
   in response to determining that the search query is directed to the narrow search for the particular game:
      designating, by the at least one server processor, the particular game with a highlight indication; and
      transmitting, by the at least one server processor, the search results and the highlight indication to the user device for display, by the user device, of a user interface that includes at least a portion of the search results, wherein the user interface includes an identifier of the particular game highlighted relative to identifiers of other search results of the at least a portion of the search results; and
   in response to determining that the search query is not directed to a narrow search for any game of the respective games, transmitting the search results to the user device without the highlight indication for display, by the user device, of the user interface that includes at least a portion of the search results with no identifiers of the respective games highlighted.

2. The computer-implemented method of claim 1, wherein absence of the match of the search query to the canonical title indicates that the search query is not directed to the narrow search for the particular game.

3. The computer-implemented method of claim 1, wherein the match of the search query to the canonical title is an exact match in which the search query and the canonical title have the same characters.

4. The computer-implemented method of claim 1, wherein the highlight indication is persistently stored in association with the search query and the particular game for a particular period of time or a plurality of subsequent search queries that match the search query, and further comprising:
removing, by the at least one server processor, the association of the highlight indication with the search query after the particular period of time has expired or after the subsequent search queries.

5. The computer-implemented method of claim 1, wherein the available games are changeable by associated users of the online gaming platform, wherein determining the respective canonical title includes, for each game:
determining, by the at least one server processor, a plurality of different titles used to designate the game in a history of availability of the game to users of the online gaming platform, wherein each of the plurality of different titles designates a different version of the game in the history of availability of the game; and
comparing, by the at least one server processor, the plurality of different titles to determine particular text that is present in text of the plurality of different titles, wherein the particular text is determined as the respective canonical title for the game.

6. The computer-implemented method of claim 5, wherein the particular text is a string of characters that exists in the plurality of different titles.

7. The computer-implemented method of claim 5, wherein determining the qualifying sessions additionally includes determining the qualifying sessions based on a respective time duration that each session of the set of games is active, and wherein determining the qualifying sessions includes:
for each session of each game of the set of games:
determining, by the at least one server processor, whether the respective time duration that the session is active meets a threshold time duration; and
in response to determining that the respective time duration meets the threshold time duration and determining that the session is initiated based on the selection of the previous search result, identifying, by the at least one server processor, the session as one of the qualifying sessions; and
assigning, by the at least one server processor, a weight to the session based on the respective time duration that the session is active, wherein the weight is used in determining the threshold proportion of the qualifying sessions.

8. The computer-implemented method of claim 1, wherein determining the qualifying sessions additionally includes:
for each session of each game of the set of games:
determining, by the at least one server processor, whether a user associated with the session performed a threshold number of activities during the session, wherein the activities include at least one of: communicating with another user during the session, or purchasing one or more game items during the session;
in response to determining that the user performed the threshold number of activities during the session, identifying, by the at least one server processor, the session as one of the qualifying sessions; and
in response to determining that the user did not perform the threshold number of activities during the session and determining that the session is initiated based on the selection of the previous search result, identifying, by the at least one server processor, the session as a non-qualifying session.

9. The computer-implemented method of claim 1, wherein the threshold proportion is a first threshold proportion and the qualifying sessions are first qualifying sessions, and, in response to designating the particular game with a highlight indication, further comprising, after a period of time after the designating:
receiving, by the at least one server processor, second search results from the data store in response to executing a second search query that is the same as the search query, wherein the second search results indicate a second set of games of the available games;
determining, by the at least one server processor, second qualifying sessions of respective games of the second set of games played by users of the second set of games, wherein the second qualifying sessions are a subset of sessions of the second set of games played by the users;
determining, by the at least one server processor, whether the particular game has been played in at least a second threshold proportion of the second qualifying sessions of the respective games of the second set of games, wherein the second threshold proportion is greater than the first threshold proportion; and
in response to determining that the particular game has not been played in at least the second threshold proportion of the second qualifying sessions of the respective games of the second set of games, removing, by the at least one server processor, the highlight indication from the particular game.

10. The computer-implemented method of claim 1, wherein the threshold proportion is more than half of the qualifying sessions such that the particular game has been played in more qualifying sessions than the other games in the set of games combined.

11. The computer-implemented method of claim 1, wherein the display of the identifier of the particular game highlighted relative to the identifiers of the other search results includes at least one of the group comprising:
displaying the identifier of the particular game with video or animated images and identifiers of the other search results without the video or animated images,
displaying the identifier of the particular game with a different border than the identifiers of the other search results,
displaying the identifier of the particular game with a different color or visual modification of text of the identifier than the identifiers of the other search results,
displaying the identifier of the particular game with a larger size than the identifiers of the other search results, and
combinations thereof.

12. The computer-implemented method of claim 1, wherein the plurality of different titles are tracked by a background process executing on the online gaming platform.

13. The computer-implemented method of claim 1, further comprising:
receiving, by the least one server processor, a selection of one of the search results by a user of the user interface;
initiating a game associated with the selected search result by the at least one server processor; and
connecting, by the at least one server processor, the user to the initiated game as a player.

14. A system comprising:
at least one processor coupled to a nontransitory computer readable medium having stored thereon software instructions that, when executed by the at least one processor, cause the at least one processor to perform operations including:
determining a respective canonical title of each game in a data store of available games that are accessible to be played on an online gaming platform;
receiving a search query from a user device;
executing the search query against a data store of available games to obtain search results from the data store, wherein the search results indicate a set of games of the available games that are matched to the search query;
determining whether the search query is directed to a narrow search for a particular game of the set of games based on:
determining whether the search query matches the canonical title of the particular game;
determining qualifying sessions of respective games of the set of games played by the users of the online gaming platform, wherein the qualifying sessions are a subset of sessions of the set of games played by the users; and
determining that a played game of the respective games qualifies as the particular game of the narrow search based on the played game having been played for a threshold proportion of the qualifying sessions of the respective games, wherein the played game has the most qualifying sessions amongst the set of games,
wherein determining the qualifying sessions includes determining the qualifying sessions based on a respective time duration that each session of the set of games is active, and wherein determining the qualifying sessions includes:
obtaining a dataset comprising sessions of each game of the set of games; and
for each session of each game of the set of games:
determining whether the respective time duration that the session is active meets a threshold time duration; and
in response to determining that the respective time duration meets the threshold time duration, identifying the session as one of the qualifying sessions; and
assigning a weight to the session based on the respective time duration that the session is active, wherein the weight is used in determining the threshold proportion of the qualifying sessions;
in response to determining that the search query is directed to the narrow search for the particular game:
designating the particular game with a highlight indication; and
transmitting the search results and the highlight indication to the user device for display, by the user device, of a user interface that includes at least a portion of the search results, wherein the user interface includes an identifier of the particular game highlighted relative to identifiers of other search results of the at least a portion of the search results; and
in response to determining that the search query is not directed to a narrow search for any game of the respective games, transmitting the search results to the user device without the highlight indication for display, by the user device, of the user interface that includes at least a portion of the search results with no identifiers of the respective games highlighted.

15. The system of claim 14, wherein absence of the match of the search query to the canonical title indicates that the search query is not directed to the narrow search for the particular game.

16. The system of claim 14, wherein the available games are changeable by associated users of the online gaming platform, wherein the operation of determining the respective canonical title includes, for each game:
determining a plurality of different titles used to designate the game in a history of availability of the game to users of the online gaming platform, wherein each of the plurality of different titles designates a different version of the game in the history of availability of the game; and
comparing the plurality of different titles to determine particular text that is present in text of the plurality of different titles, wherein the particular text is determined as the respective canonical title for the game.

17. The system of claim 16, wherein the operation of determining the qualifying sessions additionally includes:
for each session of each game of the set of games:
determining whether the session is initiated based on a selection of a previous search result from a previous search query input to a server processor, wherein the previous search result identifies the game; and
in response to determining that the session is initiated based on the selection of the previous search result and determining that the respective time duration meets the threshold time duration, identifying the session as one of the qualifying sessions.

18. A non-transitory computer-readable medium having stored thereon software instructions that, when executed by a processor, cause the processor to perform operations comprising:
receiving a search query;
causing execution of the search query against a data store of available games to obtain search results from the data store, wherein the search results indicate a set of games of the available games that are matched to the search query, wherein the available games are accessible to be played on an online gaming platform and are changeable by associated users of the online gaming platform;
determining that the search query is directed to a narrow search for a particular game in the respective games of the set of games based on:
determining a canonical title of the particular game and determining whether the search query matches the canonical title of the particular game;
determining qualifying sessions of respective games of the set of games played by the users of the online gaming platform, wherein the qualifying sessions are a subset of sessions of the set of games played by the users; and
determining that a played game of the respective games qualifies as the particular game of the narrow search based on the played game having been played for a threshold proportion of the qualifying sessions of the respective games, wherein the played game has the most qualifying sessions amongst the set of games, wherein determining the qualifying sessions includes:
  obtaining a dataset comprising sessions of each game of the set of games; and
  for each session of each game of the set of games:
    determining whether the session was initiated in response to selection of a previous search result from a previous search query input to the processor, wherein the previous search result identifies the game; and
    in response to determining that the session is initiated in response to the selection of the previous search result, identifying the session as one of the qualifying sessions;
in response to determining that the search query is directed to the narrow search for the particular game:
  designating the particular game with a highlight indication; and
  causing at least a portion of the search results to be displayed in a user interface by a display device, wherein the user interface includes an identifier of the particular game highlighted relative to identifiers of other search results of the at least a portion of the search results; and
in response to determining that the search query is not directed to a narrow search for any game of the respective games or that the search query does not match the canonical title of the particular game, causing the search results to be displayed in the user interface with no identifiers of the respective games highlighted.

19. The non-transitory computer-readable medium of claim 18, wherein determining the qualifying sessions additionally includes determining the qualifying sessions based on a respective time duration that each session of the set of games is active, and wherein determining the qualifying sessions includes:
  for each session of each game of the set of games:
    determining whether the respective time duration that the session is active meets a threshold time duration; and
    in response to determining that the respective time duration meets the threshold time duration and determining that the session is initiated based on the selection of the previous search result, identifying the session as one of the qualifying sessions.

20. The non-transitory computer-readable medium of claim 18, wherein the operation of determining the canonical title of the particular game includes:
  determining a plurality of different titles used to designate the particular game in a history of availability of the particular game to users of the online gaming platform, wherein each of the plurality of different titles designates a different version of the particular game in the history of availability of the game; and
  comparing the plurality of different titles to determine particular text that is present in text of the plurality of different titles, wherein the particular text is determined as the canonical title for the particular game.

\* \* \* \* \*